United States Patent
Snarski

[11] Patent Number: 5,941,481
[45] Date of Patent: Aug. 24, 1999

[54] DEVICE FOR INTERACTIVE TURBULENCE CONTROL IN BOUNDARY LAYERS

[75] Inventor: Stephen R. Snarski, Kohler, Wis.

[73] Assignee: The United States of America as represented by the Secretary of the Navy, Washington, D.C.

[21] Appl. No.: 08/903,274

[22] Filed: Jul. 7, 1997

[51] Int. Cl.[6] .............................. B64C 21/00; F15D 1/06
[52] U.S. Cl. ..................... 244/204; 244/203; 244/205; 244/130
[58] Field of Search .................. 244/203, 204, 244/205, 130

[56] References Cited

U.S. PATENT DOCUMENTS

| | | | |
|---|---|---|---|
| 4,516,747 | 5/1985 | Lurz | 244/205 |
| 4,802,642 | 2/1989 | Mangiarotty | 244/204 |
| 4,932,610 | 6/1990 | Maestrello | 244/203 |
| 5,320,309 | 6/1994 | Nosenchuck et al. | 244/205 |
| 5,437,421 | 8/1995 | Nosenchuck et al. | 244/205 |
| 5,791,275 | 8/1998 | Bandyopadhyay | 244/205 |

*Primary Examiner*—Charles T. Jordan
*Assistant Examiner*—Charles R. Ducker, Jr.
*Attorney, Agent, or Firm*—Michael J. McGowan; Prithvi C. Lall; Michael F. Oglo

[57] ABSTRACT

An electro-magnetohydrodynamic (EMHD) transducer that detects and manipulates the velocity of a near-wall fluid below a turbulent boundary layer includes a magnetic field generator to provide a magnetic field near a surface exposed to the fluid. A pair of spaced electrodes are disposed within the magnetic field. A controller coupled to the electrodes detects the electric field induced by the motion of a conductive fluid relative to the surface. The controller selectively activates the electrodes to generate an applied electric field between the electrodes when the detected field exceeds a threshold. The Lorentz force generated in response to the applied electric field and the magnetic field either decelerates or accelerates the motion of the conductive fluid to prevent the formation of turbulent events.

7 Claims, 8 Drawing Sheets

DEVICE FOR INTERACTIVE TURBULENCE CONTROL IN BOUNDARY LAYERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to a device for interactive turbulence control. More specifically, the present invention relates to an electro-magnetohydrodynamic transducer that can be operated in both passive and active modes to detect and manipulate the near-wall velocity field beneath turbulent boundary layers.

(2) Description of the Prior Art

There is considerable interest in controlling coherent structures in turbulent boundary layers and other wall-bounded flows such as channel and pipe flows for the purpose of reducing skin-friction drag or turbulence-induced noise and vibration. Turbulence control schemes fall into two broad categories: (i) passive techniques in which no auxiliary power is required and (ii) active techniques in which an energy expenditure is required. Passive techniques typically utilize some surface modification such as riblets, compliant coatings or large-eddy break-up devices (LEBUs) to either suppress or eliminate the formation or interaction of various coherent structures. Reductions in drag and fluctuating wall pressure levels of 5–10% are typical for passive techniques.

Active control schemes, on the other hand, effect the desired change in turbulence structure by directly modifying some parameter in the flow. Two approaches to this active control can be identified. The first involves the use of global steady-state wall influences to control the shape of the mean velocity profile and hence the ability of the boundary layer to resist transition. Examples include transpiration (suction, injection), induced viscosity gradients (heating, cooling, polymer additives), and applied pressure gradients or body forces (wall motion, magnetohydrodynamic Lorentz forces). Although reductions in drag and turbulence levels of 10–20% are possible, the net savings after cost of the required energy expenditure is considered are typically on the order of the passive techniques.

The second active control approach is interactive turbulence control in which a turbulent structure or event in the flow is selectively targeted, sensed and manipulated. Interactive control offers the potential for greatly improved net turbulence reductions since it does not attempt to control the flow by brute force but rather by applying minute adjustments to selective structures in the flow.

Interactive control schemes typically involve the use of a large surface matrix of micro-machined sensors and actuators (microelectromechanical systems, or MEMS) to sense some targeted wall perturbation such as wall pressure or wall shear associated with turbulence generating events near the wall and to subsequently modulate the 'event' with an actuator located downstream from the sensor. However, the use micro-mechanical devices is limited due to the inherent mechanical problems associated with them including mechanical failure, fouling and inadequate frequency response. Additionally, the energy consumption required for a microactuator to do useful work is currently too large for an array of such devices to achieve a net savings. A potentially greater limitation to practical implementation of any of the proposed MEMS schemes is that they attempt to manipulate abstract eddy structures in the flow by sensing a wall perturbation whose correlation and phase relationship to the flow structure is not fully understood.

To address some of these limitations, electromagnetic flow control devices have been proposed. Electromagnetic flow control devices do not contain any moving parts, and, therefore, have an inherently high frequency response and are not susceptible to many of the mechanical problems plaguing MEMS. However, electromagnetic control devices such as those described in U.S. Pat. Nos. 5,320,309 and 5,437,421 to Nosenchuck et al. do not provide interactive flow control. Those devices which have proposed the use of electromagnetics for interactive control, rely upon MEMS to sense turbulent events. Additionally, such devices typically sense one type of turbulent event and attempt to control another type of event due to the different types of sensors and actuators.

Thus, what is needed is a device for interactive control of turbulent wall-bounded flows that senses and manipulates the same turbulent flow variable, that does not rely on micro-mechanical devices and that has an inherently high frequency response.

SUMMARY OF THE INVENTION

Accordingly, it is a general purpose and object of the present invention to provide an interactive device to detect and manipulate the fluid flow structures beneath turbulent boundary layers.

Another object of the present invention is the provision of an interactive turbulence control device which detects and manipulates the same turbulent structure or event in the flow.

Another object of the present invention is the provision of an interactive control device which does not rely on micro-mechanical devices to sense or manipulate fluid flow.

A further object is to provide an interactive turbulence control device that has an inherently high frequency response.

Another object of the present invention is to provide an interactive control device that detects and manipulates the near-wall velocity field beneath turbulent boundary layers.

These and other objects made apparent hereinafter are accomplished with the present invention by providing an electro-magnetohydrodynamic (EMHD) transducer that can be used in both passive (electromagnetic induction sensor) and active (magnetohydrodynamic force actuator) modes to sense and manipulate the velocity of the near-wall fluid. The sensor and actuator functions are combined into a single device that detects and manipulates the same flow variable. The device uses a magnetic field generator to provide a magnetic field near a surface exposed to a conductive fluid moving relative to the surface. A pair of spaced electrodes are disposed within the field. A controller coupled to the electrodes detects the electric field induced by the motion of the conductive fluid relative to the surface. The controller selectively activates the electrodes to generate an applied electric field between the electrodes when the detected field exceeds a threshold. The Lorentz force generated in response to the applied electric field and the magnetic field decelerates or accelerates the motion of the conductive fluid to prevent the formation of turbulent events.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

In general terms, two types of coherent structures or organized motions can be defined in the turbulent boundary layer. The first type are large-scale motions that emanate from the outer portions of the boundary layer and extend across the entire boundary layer. The second type of coherent structure is a quasi-cyclical, ordered sequence of events in the near-wall region known as the burst-sweep cycle that is responsible for the majority of turbulence production in the boundary layer. This process is initially marked by the formation of streaks of relatively low-speed and high-speed fluid very near the wall. As the streaks convect downstream, the low-speed regions gradually lift away from the wall until they reach some critical downstream location where they move abruptly away from the wall in what is termed an ejection. At this point the low-speed streaks undergo rapid oscillations that ultimately lead to a complete break-up of the structure known as bursting. Following the burst, an in-rush or sweep of fluid toward the wall has been observed, hence, the name burst-sweep cycle.

Figure 1:
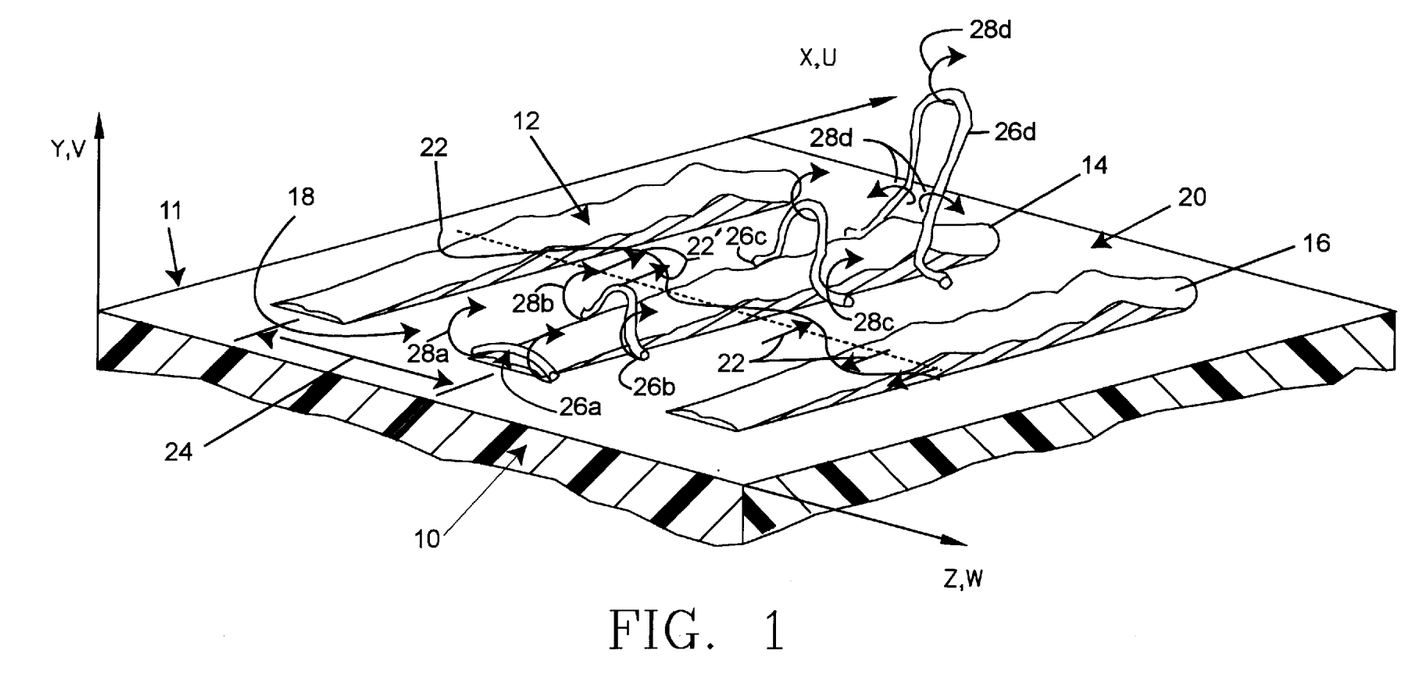
FIG. 1 is a conceptual illustration of the near-wall streaks beneath a turbulent boundary layer.

Referring now to FIG. 1, the ensemble averaged character of the near-wall streaky structure beneath a turbulent boundary layer is conceptually illustrated. In FIG. 1, a portion of a wall 10 having surface 11 exposed to a medium with three low-speed near-wall streaks 12, 14, and 16 separated by high-speed streaks 18 and 20 is shown. For ease in describing the near-wall streaks, the orientation of the coordinate system $\vec{x}=\{x,y,z\}$ and the corresponding components of the turbulent boundary layer velocity field $\vec{u}=\{u,v,w\}$ consisting of mean (time-averaged) and fluctuating (zero-mean) quantities of the form $\{U(\vec{x})+u'(\vec{x},t), v'(\vec{x},t), w'(\vec{x},t)\}$, where the prime denotes the fluctuating quantity, coincide as indicated in FIG. 1. Low-speed and high-speed streaks correspond to the conditions $u'<0$ and $u'>0$, respectively. Projection 22 illustrates the spanwise variation in streamwise velocity $u'(z)$ associated with the streaks. Each of the arrows 22' indicates the velocity $u'(z)$ at a particular point along the surface 11 of wall 10.

As shown in FIG. 1, the low-speed (or high-speed) streaks have a well defined average spanwise spacing 24 of $\lambda_z^+ = 100$ and are concentrated very near the wall ($y^+<40$). As used throughout the description, a superscript "+" indicates a variable that has been nondimensionalized with the viscous length scale $v/u_\tau$ (e.g., $y^+=yu_\tau/v$), where $v$ is the kinematic viscosity, $u_\tau=\sqrt{\tau_w/\rho}$ is the friction velocity, $\tau_w$ is the mean wall shear stress and $\rho$ is the fluid density. Typically, $u_\tau \sim 0.04 U_\infty$ where $U_\infty$ is the free-stream velocity exterior to the boundary layer. Because streak lengths are typically $x^+\sim 1000$, the x-scale has been compressed for clarity.

The velocity perturbation of the low- and high-speed streaks is typically one half the local mean velocity $|u'|\sim 0.5U$ where at this region of the flow $U\sim 10 u_\tau$. Taking as an example an underwater vehicle moving at $U_\infty=10$ m/s, the friction velocity is $u_\tau=0.4$ m/s and the viscous length is $v/u_\tau=2.5$ μm such that the streaks have a means spacing of $\lambda_z=0.25$ mm, convection velocity of $U_s=4$ m/s, and perturbation velocity of $u'_s=\pm 2$ m/s.

It is generally believed that low- and high-speed streaks are the consequence of a redistribution of streamwise momentum resulting from the formation and growth of hairpin vortex structures near the wall. Vortex structures 26a–26d illustrate various stages in the formation and development of a single hairpin vortex. The hairpin vortex is believed to form from the stretching of an initially spanwise vortex 26a at wall 10. Vortex 26a lifts from wall 10, as illustrated by vortex 26b, as it convects downstream due to self-induction of the rotating legs. The rotation of the legs, indicated by arrows 28a–28d, causes an outward flow against the mean flow between the legs ($u'<0$) and a downward flow in the direction of the mean flow outside of the legs ($u'>0$) and thus the localized regions of low- and high-speed fluid known as streaks. The hairpin vortex is continually stretched and lifted from the wall (illustrated by vortex structures 26c and 26d) as it convects downstream. Ultimately, the hairpin vortex becomes unstable leading to the breakup (bursting) of the structure.

A complete understanding of the spatio-temporal relationships between streaks, ejections, sweeps, bursts, and vortex structures is not universally agreed upon. However, it is certain that the majority of turbulence production in the boundary layer occurs during the bursting process. Bursts are always preceded by low-speed near-wall streaks. Sensing the streaks as they form and removing them before they lift from the wall, would act to stabilize the near-wall flow and control the production of turbulence in the boundary layer. Because the most definitive indicator of streak formation is a spanwise variation in streamwise velocity $u'(z)$ near the wall ($y^+<40$), a reliable means to sense and manipulate the form of the streamwise velocity profile in this region of the flow (i.e., accelerate the low-speed streaks and decelerate the high-speed streaks) is desired. As discussed below, the electro-magnetohydrodynamic (EMHD) transducer of the present invention provides this ability to both sense and manipulate spanwise variation in streamwise velocity $u'(z)$ near the wall.

Figures 2A, 2B, 2C, 2D:
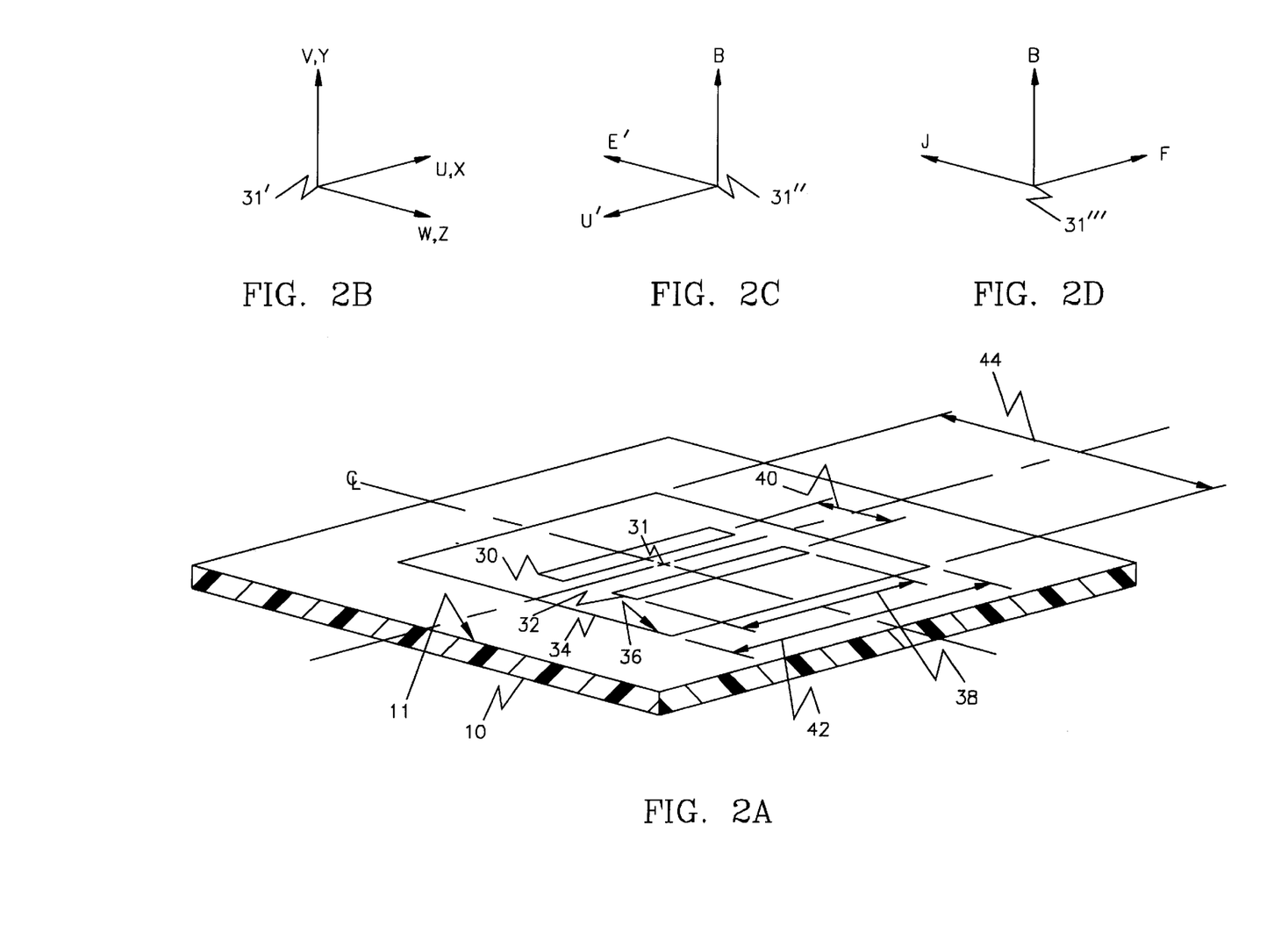
FIGS. 2A–2D illustrate the orientation and operation of the passive and active modes of an EMHD transducer.

Referring now to FIG. 2A, there is shown an electro-magnetohydrodynamic (EMHD) transducer for sensing and manipulating variations in fluid velocity near wall 10 beneath a turbulent boundary layer. The EMHD transducer consists of a pair of electrodes 30 and 32 of opposite polarity with electrode 30 being positive and electrode 32 being negative. Electrodes 30 and 32 are mounted substantially parallel to each other and substantially flush with surface 11 of wall 10. Mounted beneath electrodes 30 and 32 is permanent magnet 34. Magnet 34 is oriented such that the net magnetic flux lines above face 36 of magnet 34 point up into the fluid and are substantially perpendicular to face 36 as well as surface 11 (i.e., surface 36 is the north pole of magnet 34). Electrodes 30 and 32 have a streamwise length 38 of x=2c and spanwise separation 40 of z=2a. Magnet 34 is defined by a length 42 of x=2d and a width 44 of z=2b. The orientation of the coordinate system $\vec{x}=\{x,y,z\}$ as well as that of the turbulent boundary layer velocity field $\vec{u}=\{u,v,w\}$ are shown in FIG. 2B.

In FIG. 2B the turbulent boundary layer velocity field $\vec{u}=\{u,v,w\}$ is shown coinciding with the coordinate system $\vec{x}=\{x,y,z\}$ wherein the streamwise (x), wall-normal (y) and spanwise (z) directions are as indicated. In describing the EMHD transducer, it is assumed that the $\{x,y,z\}$ coordinate system is oriented such that the origin 31' is located at point 31 which is centered between electrodes 30 and 32 on surface 11 of wall 10 with the x-axis being parallel with the electrodes and the y-axis being perpendicular to the surface.

Referring again to FIG. 2A, depending upon the voltage condition at the electrodes, the transducer can be operated in either a passive (open-circuit) sensor mode or an active (applied voltage) actuator mode. In the passive mode, the EMHD transducer operates as an electromagnetic induction (EMI) velocity sensor. The principle of operation pivots around the process of Faraday induction in which the motion of a conducting fluid of velocity $\vec{u}(\vec{x},t)$ through a magnetic field $\vec{B}(\vec{x})$ induces an electric field on the positive charge carriers in the fluid according to $\vec{E}_{ind}(\vec{x},t)=\vec{u}(\vec{x},t)\times\vec{B}(\vec{x})$. Because the EMHD transducer only needs to sense the fluctuating part of the signal, by a.c. coupling sensor electronics (not shown) the induced electric field E' can be written as $\vec{E}'_{ind}(\vec{x},t)=\vec{u}'(\vec{x},t)\times\vec{B}(\vec{x})$ (u'<0 is illustrated in FIG. 2A). The orientation of the magnetic field B, the fluctuating motion of conducting fluid u' and the resulting induced fluctuating electric field E' are shown in FIG. 2C. The orientation of B, u' and E' relative to the EMHD transducer of FIG. 2A is given by positioning point 31" at point 31 with the fluctuating motion of conducting fluid u' parallel to electrodes 30 and 32.

Because this electromagnetic induction process occurs at all points in the fluid at which there exists a velocity and magnetic field, the potential difference $\phi(t)$ measured by the pair of electrodes 30,32 at the wall is the integral effect of the induced electric fields throughout the flow and is given by:

$$\varphi(t) = \int_R \left(\vec{u}'(\vec{x},t) \times \vec{B}(\vec{x})\right) \cdot \vec{j}_v(\vec{x}) d^3\vec{x} \tag{1}$$

where $\vec{j}_v(\vec{x})$, referred to as the virtual current density, is the current density field per unit current that would be produced if a current was passed through the electrodes with no flow present. Because $\vec{j}_v(\vec{x})$ is determined entirely by the electrode shape and electrical boundary conditions, it can be interpreted according to equation (1) as a receiving function that maps the induced electric field in the fluid to a voltage at the electrodes. Using vector identities, equation (1) can be written in the form:

$$\varphi(t) = \int_R \vec{u}'(\vec{x},t) \cdot \vec{h}(\vec{x}) d^3\vec{x} \tag{2}$$

where $\vec{h}(\vec{x})$ is the spatial sensitivity distribution function for the EMI sensor and is given by:

$$\vec{h}(\vec{x}) = \vec{B}(\vec{x}) \times \vec{j}_v(\vec{x}) \tag{3}$$

and $\Re$ represents the entire half space above wall 10 ($|x|<\infty$, $|z|<\infty$, y>0). Equation (2) illustrates that the output voltage of the EMI sensor results from a volume integral of velocity fluctuations throughout the boundary layer weighted by an electromagnetic field term $\vec{B}(\vec{x}) \times \vec{j}_v(\vec{x})$.

A complete model for all of the terms in equation (3) has been developed in Snarski, *The Response of an Electromagnetic Induction Sensor to Isotropic Turbulence*, Naval Undersea Warfare Center Division, Newport Tech. Report 10809, 1995. However, several simplifying assumptions can be introduced for the electrode and magnet configuration of interest here. First, if it can be assumed that the electrodes are long relative to their separation (which is consistent with the character of the near wall streaks as is discussed below), then $j_{v_x} \ll j_{v_y}, j_{v_z}$ such that the current density vector field is essentially 2-dimensional and spatially uniform along the length of the electrodes, or $\vec{j}_v(\vec{x})=\{0,j_{v_y}(y,z),j_{v_z}(y,z)\}$ for $|x|\leq c$. Second, if dimensions 42 and 44 (2d and 2b, respectively) of magnet 34 are large relative to the dimensions 38 and 40 (2c and 2a, respectively) of electrodes 30,32, then $B_y \gg B_x, B_z$ in the vicinity of the electrodes such that the magnetic vector field is essentially one-dimensional and spatially uniform in the plane of the wall, or $\vec{B}(\vec{x})=\{0, B_y(y), 0\}$ for $|x|\ll d$, $|z|\ll b$. As a result of these assumption, equation (3) reduces to $$\vec{h}(\vec{x}) = \hat{i}[B_y(\vec{x})j_{v_z}(\vec{x})] \tag{4}$$

where $\hat{i}$ is a unit vector in x direction, such that the induced electric field is produced by only the streamwise velocity fluctuations and is given by:

$$\varphi(t) = \int_R u'(\vec{x},t) h(\vec{x}) d^3\vec{x} \tag{5}$$

where $h(\vec{x})=|\vec{h}(\vec{x})|$.

The virtual current density field $j_v(\vec{x})$ in equation (4) can be obtained from the potential-field solution for the voltage field $\psi(\vec{x})$ produced by a line-sink/line-source pair at the wall given by:

$$\psi(\vec{x}) = \frac{i}{4\pi\sigma}\ln\left[\frac{y^2+(z+a)^2}{y^2+(z-a)^2}\right] \tag{6}$$

and Ohm's law in the form:

$$J_z(\vec{x}) = \sigma E_z(\vec{x}) \tag{7}$$

$$= -\sigma \frac{\partial \psi(\vec{x})}{\partial z}$$

where i is the current per unit electrode length (A/m), $\sigma$ is the fluid electrical conductivity (mho) and $E_z(\vec{x})$ is the spanwise electric field in the fluid (V/m). By definition, the virtual current density field is $j_{v_z}(\vec{x}) = J_z(\vec{x})/I$ where I is the electrode current (A). Using an exponential function to describe the decay of the magnetic field with distance from the wall having the form $B_o \exp(-y/\lambda_B)$ (units of T or N/Am) and taking the voltage field to be uniform along the length of the electrodes (valid for c>>a), then i=I/2c for $|x| \leq c$ and i=0 for $|x|>c$ and equation (4) combines with equations (6) and (7) to yield:

$$h(\vec{x}) = \frac{B_o e^{-\frac{y}{\beta a}}}{4\pi c} \left[ \frac{z+a}{y^2 + (z+a)^2} - \frac{z-a}{y^2 + (z+a)^2} \right], |x| \leq c \quad (8)$$

and $h(\vec{x})=0$ elsewhere. In equation (8), $\beta=\lambda_B/a$ represents the penetration depth of the magnetic field into the fluid relative to that of the electric field and, thus, the pertinent magnetic strength parameter.

Figure 3A:
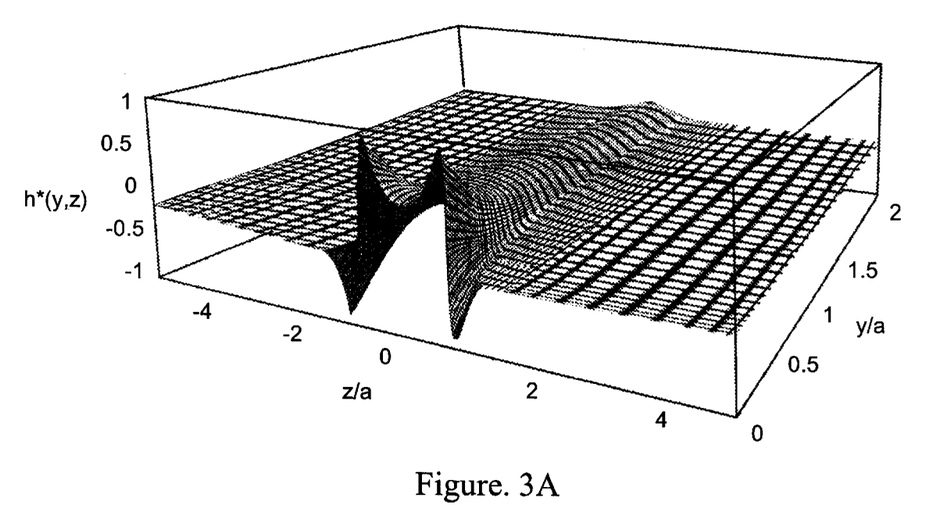
FIGS. 3A and 3B show a surface plot and a contour plot, respectively, of the nondimensionalized spatial sensitivity distribution for an EMHD transducer.
Figure 3B:
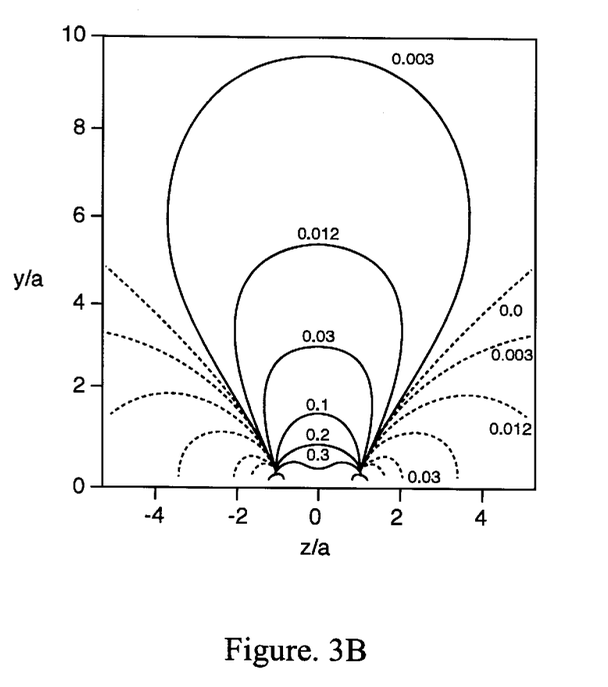

Surface and contour plots of equation (8) nondimensionalized in the form $h^*(\vec{x})=ach(\vec{x})/B_o$ are shown in FIGS. 3A and 3B as a function of y/a and z/a. A value of $\beta=100$ was used for the plot, which is consistent with a typical turbulent boundary layer application. As can be seen from FIGS. 3A and 3B, the EMI sensor weights the fluctuations near the electrodes much more heavily than those further out in the flow, and the sensor contains positive and negative sensitivities between and outside of the electrodes, respectively. These properties are a direct result of the dipole character of the virtual current field; that is, the current field is singular at electrodes, flows to the right between the electrodes, and to the left outside of them. Thus, FIGS. 3A and 3B show that although the EMI sensor output is produced by velocity fluctuations throughout the boundary layer, it is dominated by contributions from velocity fluctuations near the wall. In addition, because the sign of the contribution to the output depends upon the spanwise position of the fluctuation relative to the electrodes, the EMI sensor acts as a spatial filter with maximum output occurring for spatial disturbances with a preferred spanwise wavelength.

Referring, again, to FIG. 2A, in the active mode, the EMHD transducer operates as a magnetohydrodynamic (MHD) force generator. As with the passive mode, the principle of operation stems around the process of Faraday induction. However, in the active mode, the interaction of mutually orthogonal magnetic $\vec{B}(\vec{x})$ and electric $\vec{E}(\vec{x})$ fields applied to a conducting fluid induces a Lorentz force $\vec{F}$ on the positively charged fluid particles according to $$\vec{F}_{MHD}(\vec{x},t) = 1/\rho \vec{J}(\vec{x},t) \times \vec{B}(\vec{x}) \quad (9)$$

where $$\vec{J}(\vec{x},t) = \sigma[\vec{E}(\vec{x}) - \vec{u}(\vec{x},t) \times \vec{B}(\vec{x})] \quad (10)$$

and $\rho$ is the fluid density (kg/m$^3$). In equation (10) $\vec{E}(\vec{x})$ is the applied electric field produced by applying a voltage across the electrodes, and $\vec{u}(\vec{x},t) \times \vec{B}(\vec{x})$ is the induced electric field resulting from the interaction of the flow field with the magnetic field. Except for high speed flows with very strong magnetic fields, the second term can generally be neglected. For example, with $E \sim V_o/2a$ (from equation 7), $V_o=0.2$ V, $2a=0.2$ mm, U=10 m/s, and $B_o=1$T, then $uB/E \sim 10^{-2}$. The direction of the Lorentz force F with respect to the magnetic field B and the applied electric current density field J (J=$\sigma$E) is illustrated in FIG. 2D. The orientation of F, B and J relative to the EMHD transducer of FIG. 2A can be determined by locating point 31''' at point 31 of FIG. 2A with the Lorentz force F parallel to electrodes 30 and 32.

Neglecting the induced electric fields in equation (10) and the second order end effects, as was done in connection with equation (3), by assuming that electrodes 30,32 are long relative to their separation 40 and that the magnet dimensions 42,44 are large relative to the electrode dimensions 38,40, then $J_x<<J_y$, $J_z$ and $B_y>>B_x$, $B_z$ such that the induced MHD force acts only in the axial direction and is given by:

$$\vec{F}_{MHD}(\vec{x}) = \hat{i}[-1/\rho J_z(\vec{x})B_y(\vec{x})]. \quad (11)$$

Strictly speaking, $\vec{F}_{MHD}(\vec{x})$ for the interactive turbulence control application is still a function of time since it is not a steady-state input but one that is modulated on and off by the user. However, because of the largely resistive character of the EMHD transducer, the transducer response can be assumed instantaneous without any loss of generality.

Comparing equations (4) and (11), it is clear that the MHD force field produced by the active transducer mode is functionally equivalent to the spatial sensitivity distribution for the passive transducer mode given by equation (8) and plotted in FIGS. 3A and 3B. As a result, the MHD force produced by the electrodes is concentrated near the wall and spatially distributed in such a way as to produce a maximum effect at a particular spanwise wavelength.

Figure 4A:
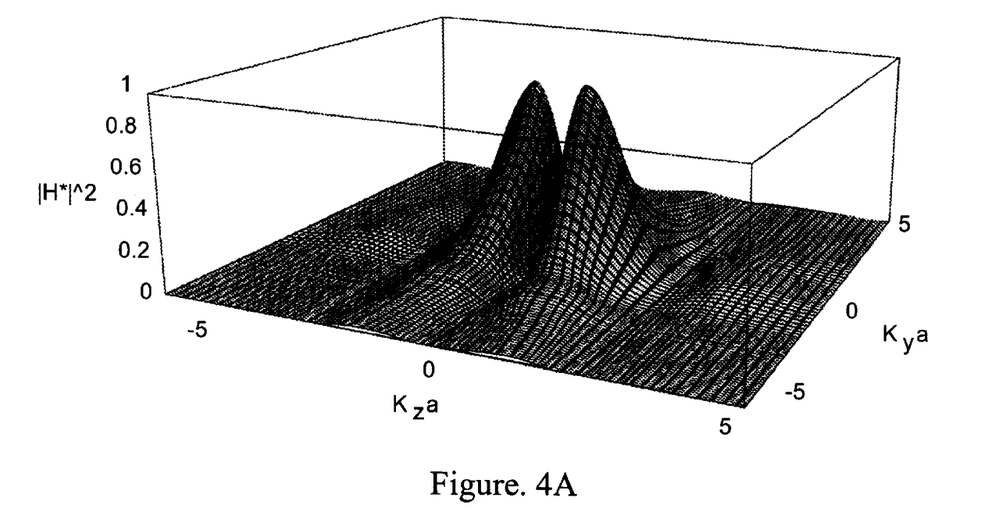
FIGS. 4A and 4B show a surface plot and a contour plot, respectively, of a nondimensionalized spatial transfer function of an EMHD transducer.
Figure 4B:
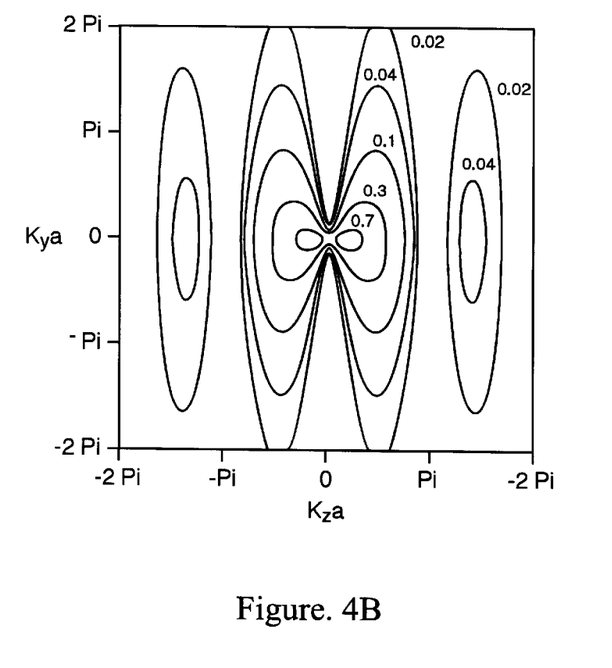

Both the sensitivity function for the passive EMI sensor mode and the induced axial force field for the active MHD actuator mode of a single pair of electrodes are described by equation (8) and shown in FIGS. 3A and 3B. As can be seen in FIGS. 3A and 3B, the function $h(\vec{x})$, referred to herein as the EMHD field function, has positive and negative values to either side of the electrodes. Thus, as previously mentioned, the EMHD transducer will respond strongly to particular wavelengths in the flow. This can be illustrated by examining the spatial transfer function $H(\vec{k})$ for the EMHD transducer which is obtained from the Fourier conjugate of $h(\vec{x})$ and given by:

$$H(\vec{k}) = \int_{-\infty}^{\infty} h(\vec{x}) e^{-i\vec{k}\cdot\vec{x}} d^3x \quad (12)$$

$$= B_o a \frac{\sin(k_x c)}{k_x c} \frac{\sin(k_z a)}{ik_y a + \beta^{-1} + |k_z a|}$$

where $\vec{k}=\{k_x, k_y, k_z\}$ is the wavenumber vector (Fourier conjugate variable of $\vec{x}$) and i=$\sqrt{-1}$. The magnitude of this function is shown in the nondimensionalized form $H^*=H/B_o a$ as both a surface plot and a contour plot in FIGS. 4A and 4B, respectively.

Referring to FIGS. 4A and 4B, the magnitude of $H(\vec{k})$ for the EMHD transducer at $k_x c=0$ and $\beta=100$ in the nondimensionalized form $H^*=H/B_o a$ characterizes the relative level at which the EMHD transducer interacts with various wall-normal and spanwise wavenumbers (or wavelengths $\lambda_i=2\pi/k_i$, i=y,z) in the flow. As can be seen in FIGS. 4A and 4B, the transducer responds most strongly to a selective band of spanwise wavenumbers $|k_z a| \sim \pi/2$ due to the combined effects of cancellation of low spanwise wavenumbers resulting from the positive and negative sensitivities (electrodes) in the spanwise direction and attenuation of the high wavenumbers resulting from the finite spanwise dimensions of the transducer. This shows that the transducer can be tuned to respond to selective wavelengths in the flow such as the mean streak spacing. The effect can be greatly enhanced by considering an array of transducers.

Figure 5:
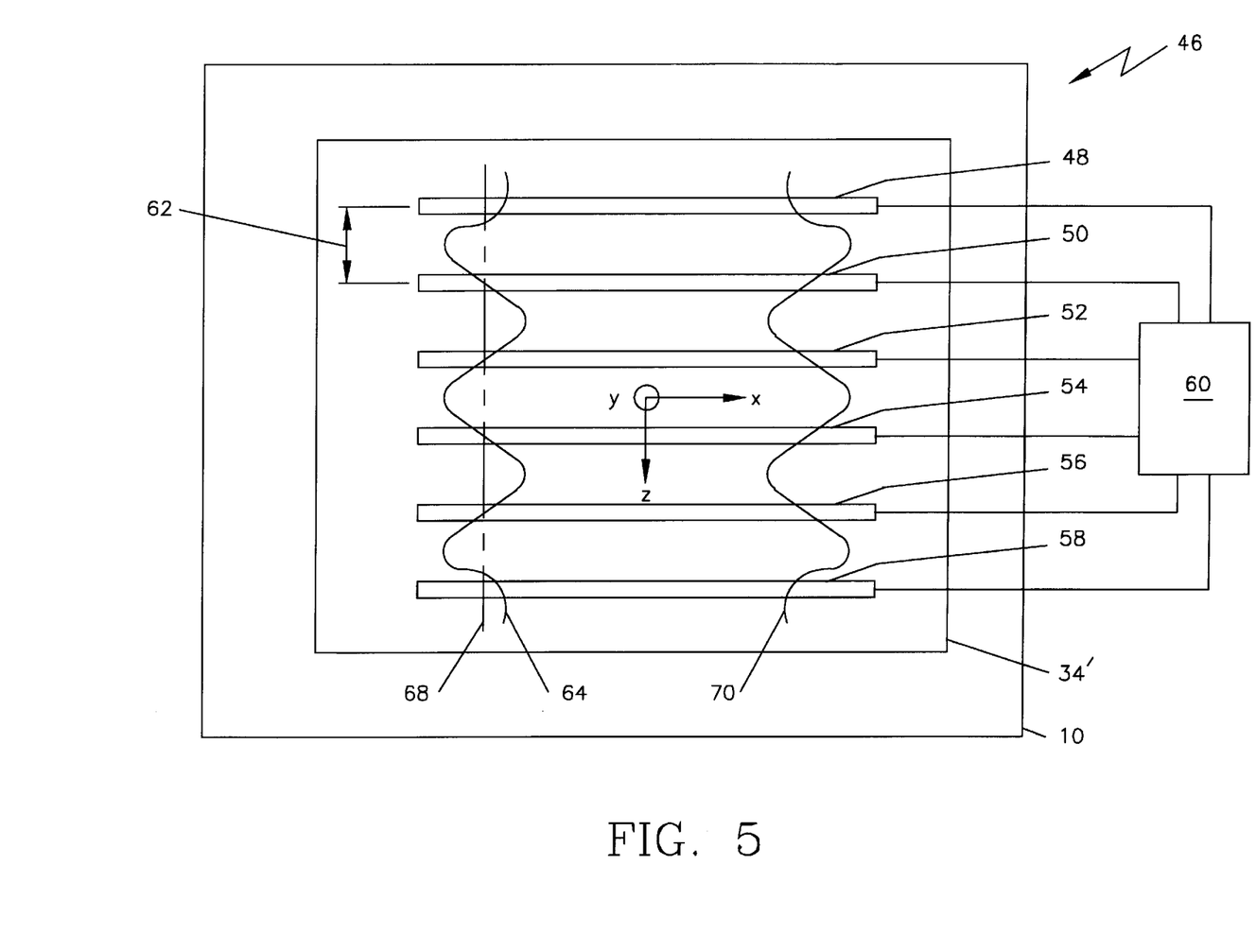
FIG. 5 is an array of EMHD transducers in accordance with the present invention.

Referring now to FIG. 5, there is shown an array 46 of EMHD transducers mounted on a wall 10 beneath a turbulent boundary layer. In FIG. 5 wall 10 is oriented with the turbulent boundary layer velocity field $\vec{u}=\{u,v,w\}$ coinciding with the coordinate system $\vec{x}=\{x,y,z\}$ wherein the streamwise (x) and spanwise (z) directions are as indicated and the wall-normal (y) direction is perpendicular to and extends out of the page. Array 46 comprises n=5 EMHD transducers formed by 6 electrodes 48, 50, 52, 54, 56, and 58 connected in parallel to controller 60 with neighboring electrodes being of opposite polarity and separated by a distance 62 of z=2a. Array 46 is mounted on magnet 34' and centered at the origin of the $\{x,y,z\}$ coordinate system.

For an array of n transducers (n+1 electrodes) connected in parallel and centered about z=0 with each electrode separated by a distance z=2a, the field function $h_{array}(\vec{x})$ is given by:

$$h_{array}(\vec{x}) = \left[ \frac{z+na}{y^2+(z+na)^2} + 2\sum_{j=1}^{n-1}(-1)^j \frac{z+(n-2j)a}{y^2+[z+(n-2j)a]^2} + (-1)^n \frac{z-na}{y^2+(z-na)^2} \right] \frac{B_o e^{-\frac{y}{\beta a}}}{4\pi c}, |x| \leq c \quad (13)$$

and the associated spatial transfer function $H_{array}(\vec{k})$ becomes:

$$H_{array}(\vec{k}) = H(\vec{k}) \sum_{j=1}^{n} (-1)^j e^{-i2(j-1)k_z a} \quad (14)$$

where $H(\vec{k})$ in equation (14) is given by equation (12).

Figure 6A:
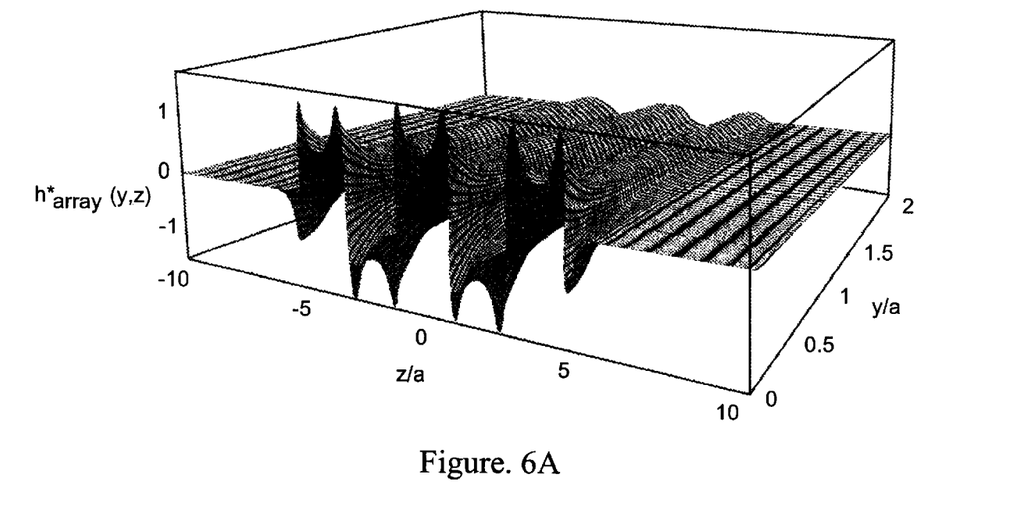
FIGS. 6A and 6B show a surface plot and a line plot, respectively, of a nondimensionalized EMHD array field function.
Figure 6B:
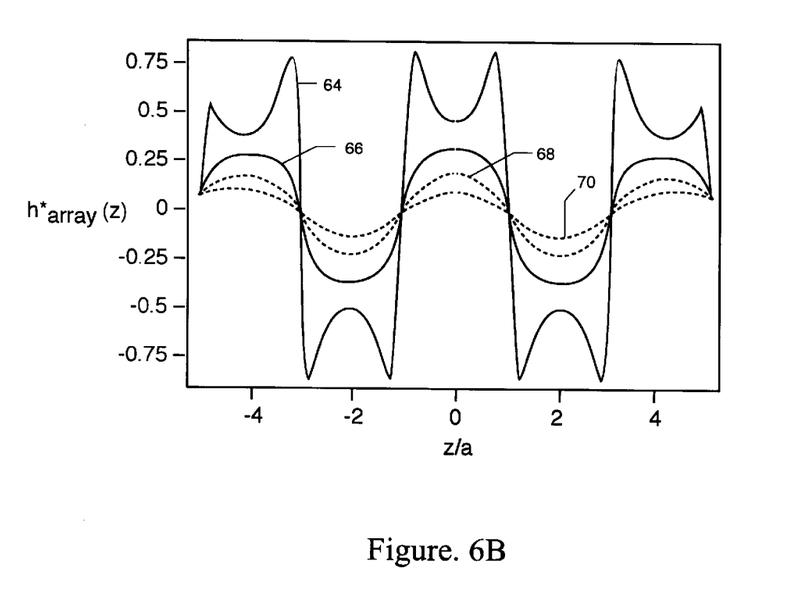

A surface plot of equation (13) in the nondimensional form $h^*_{array} = ach_{array}/B_o$ for array 46 (n=5) in the region $|x| \leq c$ for $\beta=100$ is shown in FIG. 6A. A line plot of equation (13) in the nondimensional form $h^*_{array}$ for several values of y/a is shown in FIG. 6B. In FIG. 6B, plots 64, 66, 68 and 70 correspond to values of y/a=0.2, y/a=0.6, y/a=1.0, and y/a=1.4, respectively.

Figure 7A:
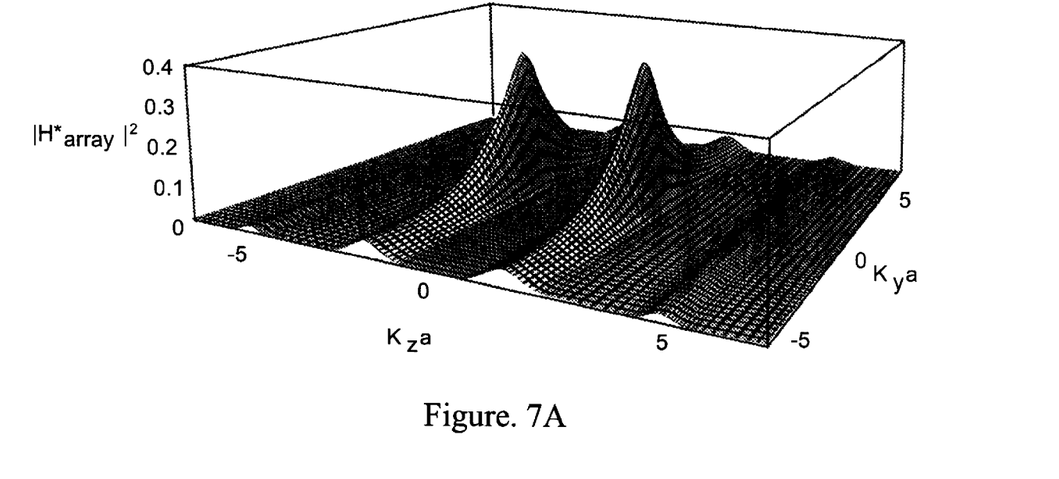
FIGS. 7A and 7B show a surface plot and a contour plot, respectively, of a nondimensionalized EMHD array spatial transfer function.
Figure 7B:
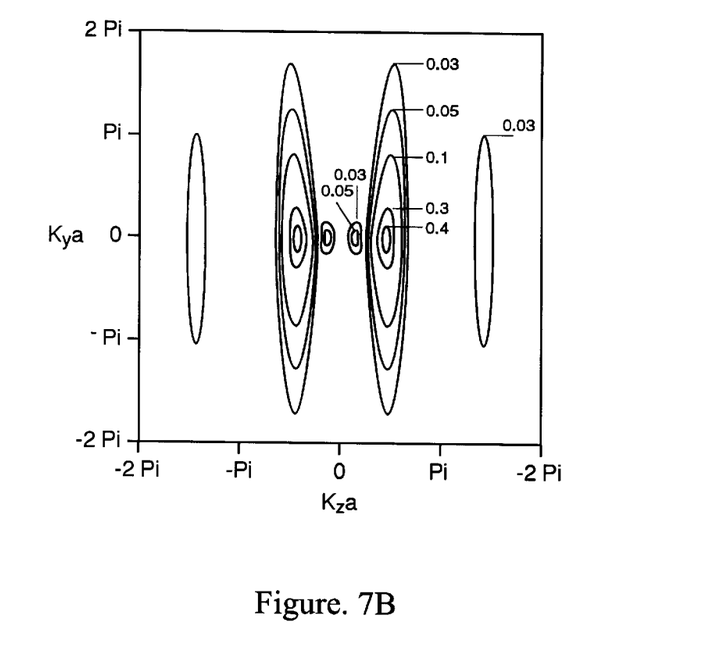

Referring to FIG. 7A, there is shown a surface plot of the array spatial transfer function (given by equation (14)) at $k_x c=0$ for $\beta=100$ in the nondimensional form $H^*_{array} = H_{array}/(n-1)B_o a$ for array 46 of FIG. 5. A contour plot of the nondimensionalized array spatial transfer function at $k_x c=0$ for $\beta=100$ is shown in FIG. 7B.

As can be seen, by adding two more electrode pairs, the sign of the EMHD field function in FIGS. 6A and 6B alternates uniformly in the spanwise direction throughout the domain of the array. As a result, the array response, shown in FIGS. 7A and 7B is dominated by the single spanwise wavenumber $|k_z a|=\pi/2$ corresponding to the spanwise wavelength $\lambda_z=4a$. Thus, the EMHD transducer array will respond nearly exclusively to the near-wall streaks if the electrode half-spacing a is equal to one quarter of the mean streak spacing $\lambda^+_z=100$, or $a^+=25$.

The electrode spacing can be selected to assure that the transducer array responds to the spanwise wavelength of the streaks; however, the array will only be able to efficiently sense and manipulate the streaks if the field function $h(\vec{x})$ predominantly acts in the region near the wall occupied by the streaks ($y^+<40$). The form of the integrated EMHD field function normalized by the total integrated value as a function of y is given by:

$$W(y) = \frac{\int_0^y \int_{-\infty}^{\infty} |h(\eta,z)| dz d\eta}{\int_0^{\infty} \int_{-\infty}^{\infty} |h(\eta,z)| dz d\eta} \quad (15)$$

where $h(\eta,z)$ is given by equation (8) or (13).

Figure 8:
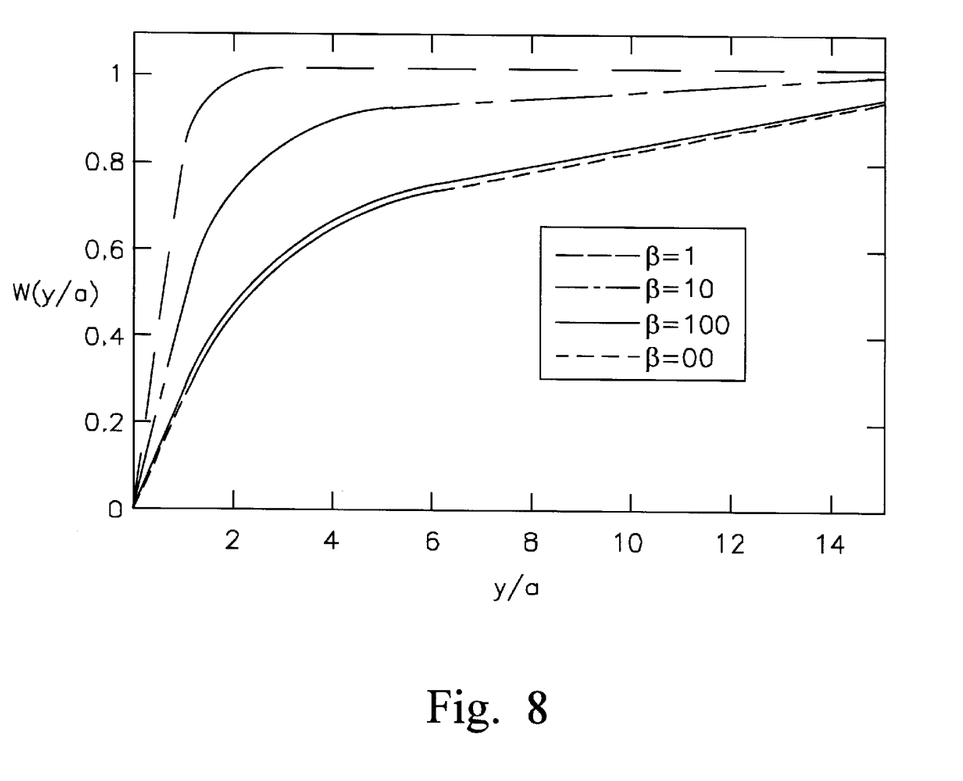
FIG. 8 is a plot of the integrated EMHD field function normalized by the total integrated value for several magnetic strengths.

Referring to FIG. 8, there are shown plots of equation (15) for four values of the magnet strength parameter ($\beta=1, 10, 100$ and $\infty$). Because the effect of increasing $\beta=\lambda_B/a$ is to increase the penetration depth of the magnetic field into the fluid, increasing the magnet strength parameter $\beta$ causes the effect of the EMHD transducer to extend further from the wall. However, even for the case $\beta=\infty$ corresponding to the limiting case of extremely high magnet strength and very close electrode spacing (i.e., the magnetic field does not decay in the region in which the electrodes have an effect on the flow), 60% of the integrated EMHD field function occurs in the region y/a<1.6 or $y^+<40$ with $a^+=25$. As a result, the EMHD transducer affect will be predominantly felt in the region of the flow occupied by the near-wall streaks, as required.

Referring once again to FIG. 5, the operation of the EMHD interactive control system will be described. In operation, the number of transducers in the full array would need to be large enough to cover the spanwise extent of the boundary surface under control, and sub-arrays of transducers with spanwise extents which scale with the spanwise coherence length of the mean streak spacing would likely be used as individual array elements. One possible scaling factor is $2na \sim \delta$ where $\delta$ is the boundary layer thickness, although other scaling factors could also be used.

Controlling turbulence by manipulating low-speed and high-speed streaks, involves detecting the existence of a spanwise variation in streamwise velocity u'(z) associated with the near-wall streaks by measuring the open-circuit voltage induced across the electrodes (passive EMI sensor mode) and manipulating the variations in streamwise velocity by applying an appropriate voltage across the electrodes to decelerate or accelerate the fluid flow (active MHD force generator). Controller 60 operates to control the array by switching between the passive and active modes of operation when appropriate. Thus, if line 64 represents the spanwise variation in streamwise velocity u'(z) relative to the mean streamwise velocity represented by line 68, electrodes 48, 52 and 56 would be positive, with electrodes 50, 54, 58 being negative or ground, such that the induced passive response according to equation (5) is $\phi \sim \int u' h dz < 0$. When operating in the passive mode, controller 60 monitors the voltage induced across the electrodes within the EMHD transducer array. When the magnitude of this sensor output exceeds a pre-established threshold representative of developing streaks, controller 60 switches the EMHD transducer array detecting the streaks to an active mode by applying a voltage $V_0$ across the electrodes of appropriate polarity to attenuate the velocity perturbation and stabilize the near-wall flow (i.e., accelerate the low-speed fluid and decelerate the high-speed fluid). From equations (7) and (11), the applied electrode voltage and the applied streamwise MHD force field between the positive and negative electrodes (electrodes 48 and 50, 52 and 54, or 56 and 58 in FIG. 5) are related according to:

$$F_{MHD} \sim \frac{\sigma B_0}{\rho} \frac{V_0}{2a}. \quad (16)$$

Thus, for the streak orientation shown in FIG. 5, the appropriate response is $V_0 > 0$. Plot 70 illustrates the applied force $F_{MHD}(z)$ for the orientation of FIG. 5 with $V_0 > 0$. If the streaks were oriented opposite to that shown in FIG. 5, the induced passive and required active responses would be $\phi > 0$ and $V_0 < 0$, respectively.

It should be noted that because the mean streak spacing is a predictable function of the free stream velocity, the array could be operated at a large number of discrete flow speeds by grouping other than adjacent electrodes, provided the spacing of adjacent electrodes is established from the largest anticipated flow speed. That is, for array 46 of FIG. 5, at low speeds, a single transducer comprised of electrode 50 and 56 could be operated. As speeds increased, the appropriate voltages could be applied to electrodes 48, 52, and 56 to create two transducers or switched to all six electrodes to operate five transducers. It is understood that in designing and operating an array in such a manner, the spacing between adjacent elements need not be uniform as shown in FIG. 5. Also, if full arrays of electrodes were appropriately spaced in x, turbulence generation could be delayed indefinitely.

Although the required polarity of the applied voltage is straight forward, the goal of the interactive control scheme is to neutralize the spanwise perturbation in the near-wall streamwise velocity profile. To effectively neutralize velocity variations requires the ability to relate the magnitude and duration of the applied voltage to the magnitude of the detected velocity perturbation (as calibrated from the EMI sensor output). An estimate can be obtained by examining the magnitude of the applied MHD force relative to the inertial forces associated with accelerating or decelerating the near-wall fluid, $$N^* = \frac{F_{MHD}}{\partial u'_s / \partial t} \quad (17)$$

where $F_{MHD}$ is given by equation (16), $\partial u'_s \sim u'_s$ is the perturbation velocity of the streak to be removed, $\partial t = \Delta t$ is the duration of the applied voltage, and N* is referred to as the imposed interaction parameter. Perturbations in the near-wall flow must be removed before they convect out of the control volume of the electrodes. Thus, the condition $\Delta t < 2c/U_s$ where $U_s$ is the convection velocity of the near-wall streaks is imposed. With $u'_s \sim 5u_\tau$ and $U_s \sim 10u_\tau$ as discussed above in reference to FIG. 1, equations (16) and (17) can be solved for the required electrode voltage and duration as:

$$V_0 \sim 10^2 \frac{q_\tau}{\sigma} \left[ \frac{N^*}{B_0(c/a)} \right] \text{(V)} \quad (18)$$

and $$\Delta t \sim 0.2 t^+ [a^+(c/a)] \text{ (s)} \quad (19)$$

where $q_\tau = 0.5\rho u_\tau^2$ (Pa) and $t^+ = v/u_\tau^2$ (s). The power P required per element can then be estimated from the product of the applied voltage $V_0$, electrode current density $J_0 \sim \sigma V_0/2a$, and effective flow area through which the current acts (~4ac) as $$P \sim 2 \times 10^4 l^+ \frac{q_\tau^2}{\sigma} \left[ \frac{N^{*2} a^+}{B_0^2(c/a)} \right] \text{(W)} \quad (20)$$

where $l^+ = v/u_\tau$.

Since the per element power requirements must be minimized if the interactive control scheme is to achieve a net savings, it is clear from equation (20) that for any set of flow conditions it is desirable to make the magnetic field strength at the surface $B_o$ and the electrode length-to-separation ratio c/a as large as possible.

Thus, what has been described is a novel device for interactively controlling turbulence in turbulent boundary layers. The electro-magnetohydrodynamic transducer array described herein provides a physically realizable approach to perform interactive turbulence control in electrically conducting (e.g., sea water) turbulent boundary layers. The device provides several new features and advantages over prior art systems. For example, the device targets, senses, and manipulates the single most relevant and reliable indicator of the pre-burst turbulence production process—streaks of high-speed and low-speed fluid near the wall. Additionally, the device does not contain any moving parts and therefore is not susceptible to fouling or mechanical failure in adverse field environments. Furthermore, the frequency response is essentially instantaneous since it is a purely resistive electromagnetic device.

Obviously many modifications and variations of the present invention may become apparent in light of the above description. For example, the transducer array could consist of any number of electrode pairs in the spanwise (z) direction. The electrodes themselves could have rectangular, circular or any other cross section, could be made of any electrically conducting material, and could have a range of acceptable length-to-separation ratios. The transducer magnet could be a single large permanent magnet, a group of permanent magnets that yields the same net magnetic field, or a single or group of electromagnets. The magnet shape could also be other than rectangular provided the magnet boundaries are well outside the region occupied by the electrodes (i.e., b,d>>c,a). The fundamental design presented here also encompasses groups or banks of arrays (consisting of magnet and groups of electrodes) spaced in the streamwise (x) direction with any separation distance between them.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A device for controlling turbulence in an electrically conductive fluid moving relative a surface exposed to the fluid, said device comprising:

magnetic field generating means for generating a magnetic field in said fluid near said surface in a direction generally perpendicular to said surface in a y-direction for a right handed coordinate system;

a pair of electrodes, said electrodes being arranged such that motion of said conductive fluid relative to said surface induces an electric field between said pair of electrodes;

detector means for measuring induced electric field in said conductive fluid moving relative to said surface in the x-direction of said right handed coordinate system and parallel to said surface; and a controller, coupled to said electrodes, for measuring a value of said induced electric field and for selectively activating said pair of said electrodes to generate an applied electric field between said pair of electrodes in response to said measured value.

2. The device of claim 1 wherein said pair of electrodes and said magnetic field generating means are arranged such that interaction of said magnetic field and said applied electric field induce a Lorentz force having a nonzero component parallel to said surface.

3. The device of claim 2 wherein said electrodes are disposed entirely within said magnetic field.

4. The device of claim 3 wherein said magnetic field generating means comprises at least one permanent magnet.

5. The device of claim 3 wherein said magnetic field generating means comprises at least one electromagnet.

6. The device of claim 1 wherein said controller measures a value indicating a spanwise variation in the streamwise velocity of said conductive fluid relative to said surface.

7. The device of claim 1 wherein said electrodes are arranged such that interaction of said magnetic field and said applied electric field induce a Lorentz force having a component parallel to said surface that is greater than the component perpendicular to said surface.

\* \* \* \* \*